United States Patent [19]

Kaminaga

[11] Patent Number: 4,677,459
[45] Date of Patent: Jun. 30, 1987

[54] REFERENCE SIGNAL GENERATOR
[75] Inventor: Kouzou Kaminaga, Kanagawa, Japan
[73] Assignee: Sony Corporation, Tokyo, Japan
[21] Appl. No.: 789,829
[22] Filed: Oct. 21, 1985
[30] Foreign Application Priority Data Oct. 22, 1984 [JP] Japan .............................. 59-221580

[51] Int. Cl.$^4$ ............................................ H04N 9/475
[52] U.S. Cl. ...................................... 358/19; 358/337; 358/320; 358/17
[58] Field of Search ................ 358/19, 320, 323, 324, 358/335, 337, 339, 318, 315, 316, 17, 20; 360/36.1, 36.2

[56] References Cited

U.S. PATENT DOCUMENTS

| | | | |
|---|---|---|---|
| 4,119,999 | 10/1978 | Gallo | 358/17 X |
| 4,257,830 | 2/1981 | Tanami | 358/320 |
| 4,339,770 | 7/1982 | Dennison et al. | 358/19 |
| 4,373,168 | 2/1983 | Mizukami et al. | 358/19 |
| 4,438,456 | 3/1984 | Yoshinaka | 358/320 X |
| 4,562,457 | 12/1985 | Salvia | 358/19 |

Primary Examiner—James J. Groody
Assistant Examiner—Victor R. Kostak
Attorney, Agent, or Firm—Lewis H. Eslinger; Alvin Sinderbrand

[57] ABSTRACT

A reference signal generator used to compensate for a time base error of a color video signal reproduced from a video tape recorder having a memory into which the color video signals are written in response to a write clock and from which the color video signals are read in response to a read clock and a read start pulse, comprises a color frame detector adapted to detect a color framing condition from a reference sync. (synchronizing) signal and a reference burst signal and to generate a color framing indicating signal. Also included are first phase controller for controlling a phase of chrominance subcarrier signal in response to a subcarrier phase control signal, the chrominance subcarrier signal being phase-locked with the reference burst signal, a second phase controller for controlling a phase of the reference sync. signal in response to a sync. phase control signal and the subcarrier phase control signal, and a read-start signal generator circuit responsive to the color framing indicating signal, the phase-controlled chrominance subcarrier signal and the phase-controlled reference sync. signal for generating the read start pulse to be supplied to the memory of the video tape recorder.

7 Claims, 8 Drawing Figures

FIG. 3A ⓐ 
FIG. 3B ⓑ 
FIG. 3C ⓒ 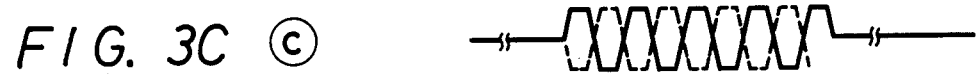
FIG. 3D ⓓ 
FIG. 3E ⓔ 
FIG. 3F ⓕ 

REFERENCE SIGNAL GENERATOR

BACKGROUND OF THE INVENTION

1. Field of the Invention

The present invention relates generally to a reference signal generator for use with a time base corrector (TBC) for correcting a time base error of a color video signal reproduced from a VTR (video tape recorder), and more particularly, is directed to a reference signal generator for generating a read start pulse which is supplied to a memory of the TBC to thereby conrol the read-start timing of the color video signals from the memory.

2. Description of the Prior Art

A prior art technology will hereinafter be described with reference to FIG. 1. In FIG. 1, reference numeral 2 designates a digital VTR (video tape recorder) and reference numeral 3 designates a digital processor which is formed independently of the digital VTR 2. Reference numeral 1 designates an input terminal to which a reference color video signal containing sync. (synchronizing) signals (horizontal and vertical sync. signals), a burst signal and a color framing information is applied. The reference color video signal from the input terminal 1 is supplied to the digital VTR 2 and the digital processor 3. In the VTR 2, a color framing detecting signal is obtained from the reference color video signal by a color framing detector (not shown) and the VTR 2 is servo-controlled in phase to synchronize the framing of the reproduced video signal with the framing of the color framing detecting signal. The synchronized video signal is then fed to a time base corrector (including a memory and a D/A (digital-to-analog) converter) 4 of the digital processor 3.

Further, the reference color video signal from the input terminal 1 is supplied to a sync. signal/burst signal separating circuit 7 of the digital processor 3. Reference numerals 7a and 7b designate adjusting means comprising resistors thereof for adjusting separately a phase of a sync. signal and a phase of a chrominance subcarrier signal which will be described later. The sync. signal/burst signal separating circuit 7 generators the chrominance subcarrier signal and a clock signal having a frequency of, for example, four times the frequency of the chrominance subcarrier signal in response to the separated sync. signal and burst signal.

The sync. signal and the burst signal from the sync. signal/burst signal separating circuit 7 also supplied to a sync. signal/burst signal adding circuit 5 to which the output from a time base corrector 4 is supplied and the sync. signal and the burst signal are added to the reproduced color video signal therein. The clock signal from the separating circuit 7 is supplied to a memory of the time base corrector 4. The sync. signal, the burst signal and the chrominance subcarrier signal from the separating circuit 7 are all supplied to a read start signal generator 8. The read start signal generator 8 generates a color framing detecting signal based on the burst signal and the sync. signal. Further, the read start signal generator 8 is adapted to generate a read start signal based on the color framing detecting signal, the sync. signal and the chrominance subcarrier signal. The read start signal from the read start signal generator 8 is supplied to the memory of the time base corrector 4, thereby to control a read start timing of the video interval of the reproduced video signal stored in the memory.

Then, at an output terminal 6 of the digital processor 3 there is developed the reproduced analog color video signal to which the sync. signal and the burst signal are added and the color framing of which is synchronized with that of the reference color video signal.

However, such prior art system has some disadvantages as follows: If the user operates the digital processor 3 to adjust the phases of the sync. signal and the chrominance subcarrier signal, the phase relationship between the horizontal sync. signal and the burst signal has to be adjusted once again in a color framing detector in consideration of the odd and even fields. Further, there is a fear that the reliability about the timing of the read start signal will be deteriorated.

OBJECTS AND SUMMARY OF THE INVENTION

Accordingly, it is an object of this invention to provide a reference signal generator for use with a time base corrector (TBC) for correcting a time base error of a color video signal reproduced from a VTR (video tape recorder).

Another object of this invention is to provide a reference signal generator for generating a read start pulse which is supplied to a memory of the TBC to thereby control the read-start timing of the color video signals from the memory.

Further object of this invention is to provide a reference signal generator for generating a read start pulse, the timing of which is not affected even when a predetermined phase relationship between a reference sync. signal and a chrominance subcarrier signal is controlled.

According to one aspect of the present invention, there is provided a reference signal generator for use with a color video signal processing circuit including memory means into which color video signals are written in response to a write clock and from which the color video signals are read in response to a read clock and a read start pulse comprising: means for detecting a color framing condition from a reference sync. signal and a reference burst signal and generating a color framing indicating signal; first means for controlling a phase of a chrominance subcarrier signal in response to a subcarrier phase control signal, said chrominance subcarrier signal being generated in synchronism with said reference burst signal; second means for controlling a phase of said reference sync. signal in response to a sync. phase control signal and said subcarrier phase control signal; and means responsive to said color framing indicating signal, the phase-controlled chrominance subcarrier signal and the phase-controlled reference sync. signal for generating said read start pulse therefrom.

These and other objects, features and advantages of the present invention will become apparent from the following detailed description of the preferred embodiment taken in conjunction with the accompanying drawings.

BRIEF DESCRIPTION OF THE DRAWINGS

FIGS. 3A to 3F are respectively waveform diagrams useful for explaining the operation of the reference signal generator of FIG. 1.

DESCRIPTION OF THE PREFERRED EMBODIMENT

Figure 1:
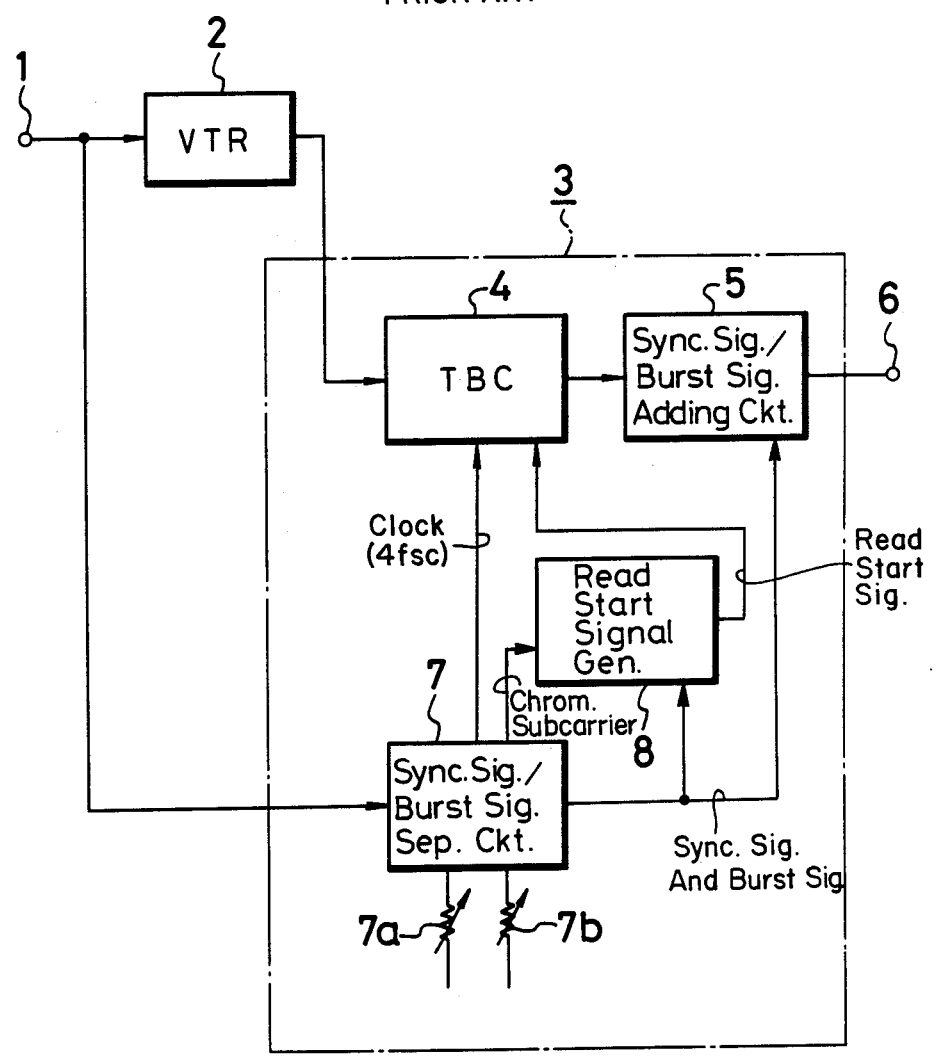
FIG. 1 is a block diagram showing a prior art VTR (video tape recorder) and a digital processor.
Figure 2:
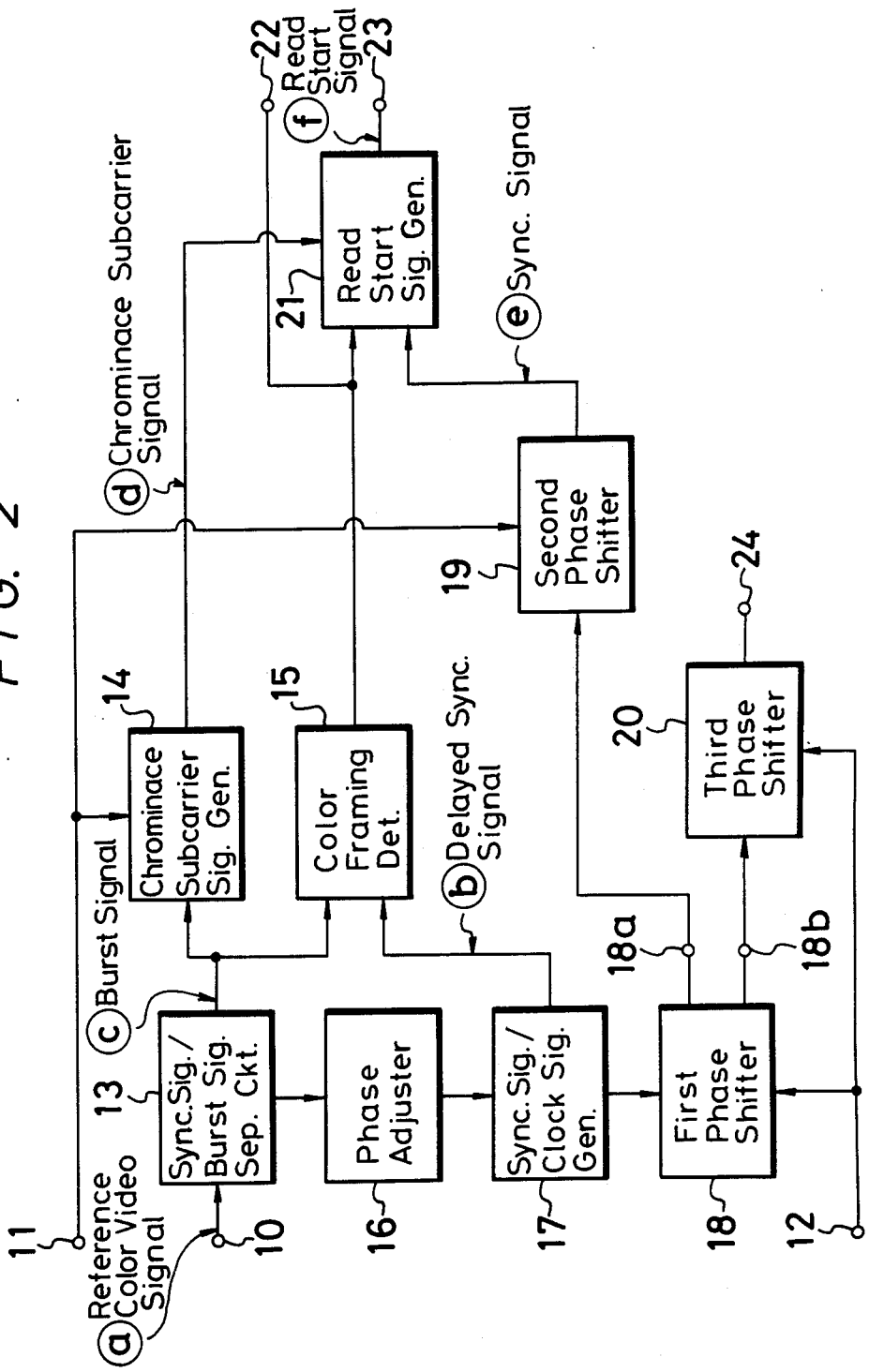
FIG. 2 is a block diagram showing an embodiment of a reference signal generator according to the present invention.

An embodiment of a reference signal generator according to the present invention will hereinafter be described with reference to FIG. 2 and FIGS. 3A to 3F. In this embodiment, the reference signal generator of the invention is constructed with a digital VTR integrally. Referring to FIG. 2, a reference color video signal ⓐ (refer to FIG. 3A) containing sync. signals (horizontal and vertical sync. signals), a burst signal and a color framing information is applied to an input terminal 10 and then supplied to a sync. signal/burst signal separating circuit 13. This color framing information is presented as a relative phase (for example, 0°, 90°, 180° and 270°) of the burst signal to reference timing of the the horizontal sync. signal in the odd or even field. Reference numeral 11 designates an input terminal to which a chrominance subcarrier phase control signal from a manual phase adjuster (not shown) is supplied. While, reference numeral 12 designates an input terminal to which a sync. phase control signal from other manual phase adjuster (not shown) is supplied.

The sync. signals (horizontal and vertical sync. signals) from the sync. signal/burst signal separating circuit 13 are supplied through a phase adjuster 16 to a sync. signal/clock signal generator circuit 17 incorporating therein a PLL (phase locked loop).

If the reference color video signal from the input terminal 10 is not in such phase relationship between the burst signal and the horizontal sync. signal as to be indicated by the color framing information, the phase of the sync. signal is adjusted by the above mentioned phase adjuster 16, whereby the color framing information can be realized by the predetermined phase relationship between the burst signal and the adjusted horizontal sync. signal.

The sync. signal/clock signal generator circuit 17 produces a sync. signal ⓑ (see FIG. 3B) which is delayed by a predetermined time up to the position of the burst signal with an accuracry of the clock signal. This sync. signal ⓑ and the burst signal ⓒ (see FIG. 3C) derived from the sync. signal/burst signal separating circuit 13 are both supplied to a color framing detector circuit 15 in which a color framing detecting signal is produced by detecting the phase of the burst signal ⓒ at a timing of the leading edge of the delayed horizontal sync. signal ⓑ, consideration of the odd or even fields. The color framing detecting signal is supplied to a read start signal generator circuit 21, which will be described later, and is also supplied through an output terminal 22 to a reproducing circuit provided in the main body of the digital VTR (not shown).

The burst signal ⓒ from the separating circuit 13 is further supplied to a chrominance subcarrier signal generator circuit (formed of a PLL and a phase shifter) 14 which produces a chrominance subcarrier signal ⓓ (see FIG. 3D), the phase of which is shifted within a range of 0° to 360° (90° in the illustrated example) by the chrominance subcarrier phase control signal from the input terminal 11. This chrominance subcarrier signal ⓓ is fed to the read start signal generator circuit 21 which will be described later.

On the other hand, the sync. signal and the clock signal having a frequency of, for example, four times the chrominance subcarrier frequency $f_{sc}$ are fed to a first phase shifter circuit 18, in which the sync. signal is phase-controlled by the sync. phase control signal from the input terminal 12. The first phase shifter circuit 18 produces at its output terminal 18a a sync. signal which is phase-shifted by the amount of an integer number times of the chrominance subcarrier period $T_{SC}$. Then, this sync. signal is fed to a second phase shifter circuit 19. While, the first phase shifter circuit 18 produces at another output terminal 18b a sync. signal, the phase of which is shifted by the amount of integer number times of $T_{SC}/4$. This sync. signal is fed to a third phase shifter circuit 20.

In the second phase shifter circuit 19, the input sync. signal is phase-shifted by the duration of time equal to (having a tolerance of ±180° in practice) the phase-shifted amount of the chrominance subcarrier signal in the chrominance subcarrier signal generator circuit 14 in response to the chrominance subcarrier signal phase control signal from the input terminal 1. A sync. signal ⓔ (see FIG. 3E) which is thus obtained from the second phase shifter circuit 19 is fed to the read start signal generator circuit 21.

Thus, this read start signal generator circuit 21 generates a read start signal ⓕ (see FIG. 3F) indicative of the read start point of the video interval. This read start signal ⓕ is supplied via an output terminal 23 to a memory (a memory such as a time base corrector and the like into which the reproduced color video signal is written) in the reproducing circuit of the main body of the VTR. It is herein noted that the duration of time from the leading edge of the horizontal sync. signal to the start point of the burst signal interval and the burst signal duration are respectively constant, the duration of time from the end point of the burst signal interval to the start point of the video signal interval is different dependent on the phase of the adjusted burst signal (color framing). Hence, since the relative phase between the chrominance subcarrier signal and the sync. signal is set to be an integer times the period of the chrominance subcarrier signal. The read start signal generator circuit 21 generates the read start signal which coincides with the start point of the video signal interval regardless of the partial phase adjustment of the chrominance subcarrier signal and the sync. signal. Unlike the prior art, there is another advantage in that the detection of the color framing information is carried out at only one place.

In the third phase shifter circuit 20, the horizontal sync. signal from the output terminal 18b of the first phase shifter circuit 18 is again phase-shifted within a range of $T_{SC}/4$ (or possibly within a range of $T_{SC}$) by the sync. phase control signal from the input terminal 12. This sync. signal thus phase-shifted is supplied through an output terminal 24 to a sync. signal adding circuit of the reproducing circuit provided in the main body of the VTR and then read out from the memory. Thereafter, this sync. signal is added to a reproduced analog color video signal that was converted in the form of the digital signal to the analog signal. Accordingly, the sync. signal delivered from the output terminal 24 becomes equal to the reference sync. signal which is phase-shifted within a desired range.

According to the present invention as described above, it is possible to obtain the reference signal generator which can produce the read start signal for the start timing of the video interval of the reproduced video signal, whose timing is not disturbed even if the phases of the reference sync. signal and the chrominance subcarrier signal are controlled.

The above description is given on a single preferred embodiment of the invention but it will be apparent that many modifications and variations could be effected by one skilled in the art without departing from the spirit or scope of the novel concepts of the invention so that the scope of the invention should be determined by the appended claims only.

We claim as our invention:

1. A reference signal generator receiving a reference color video signal including sync. and reference burst signals, a chrominance subcarrier phase control signal, and a sync. phase control signal for use with a color video signal processing circuit including a memory into which color video signals are written in response to a write clock and from which the color video signals are read in response to a read clock and a read start pulse, the generator comprising:

means for detecting a color framing condition from said reference sync. signal and said reference burst signal and generating a color framing indicating signal;

first means for controlling a phase of a chrominance subcarrier signal of said color video signal in response to said chrominance subcarrier phase control signal, said chrominance subcarrier signal being generated in synchronism with said reference burst signal;

second means for controlling a phase of said reference sync. signal in response to said sync. phase control signal and said color subcarrier phase control signal; and means responsive to said color framing indicating signal, said phase-controlled chrominance subcarrier signal and said phase-controlled reference sync. signal for generating said read start pulse therefrom.

2. A reference signal generator according to claim 1, in which said second means comprises a first phase shifter receiving said reference sync. signal for controlling the phase thereof in response to said sync. phase control signal and a second phase shifter receiving a phase-shifted sync signal from said first phase shifter for further controlling the phase thereof in response to said chrominance subcarrier phase control signal.

3. A reference signal generator according to claim 2, in which said first phase shifter shifts the phase of said reference sync. signal by an amount equal to n times the chrominance subcarrier period, where n is an integer.

4. A reference signal generator according to claim 3, in which said second means further comprises a third phase shifter connected to an output of said first phase shifter for shifting the phase of said reference sync. signal within a range determined by said chrominance subcarrier period.

5. A reference signal generator according to claim 1, in which said first means comprises a phase-locked loop circuit which is phase-locked with said reference burst signal and a phase shifter which is controlled by said subcarrier phase control signal.

6. A reference signal generator according to claim 1, in which said read start pulse generating means comprises a comparator which compares in phase the phase-controlled chrominance subcarrier signal with the phase-controlled reference sync. signal to generate said read start pulse upon detection of a predetermined phase relationship therebetween.

7. A reference signal generator according to claim 6, in which said predetermined phase relationship is changed in accordance with said color framing indicating signal.

* * * * *